(12) United States Patent
Vance et al.

(10) Patent No.: US 11,511,302 B2
(45) Date of Patent: Nov. 29, 2022

(54) FLUID APPLICATION FOR AUTONOMOUS HAUL TRUCKS

(71) Applicant: Caterpillar Global Mining LLC, Tucson, AZ (US)

(72) Inventors: Michael Vance, Sahuarita, AZ (US); Jagath Samaraweera, Dunlap, IL (US)

(73) Assignee: Caterpillar Global Mining LLC, Tucson, AZ (US)

( * ) Notice: Subject to any disclaimer, the term of this patent is extended or adjusted under 35 U.S.C. 154(b) by 762 days.

(21) Appl. No.: 16/538,311

(22) Filed: Aug. 12, 2019

(65) Prior Publication Data

US 2021/0046499 A1 Feb. 18, 2021

(51) Int. Cl.
| | | |
|---|---|---|
| G05D 7/00 | (2006.01) | |
| G05D 11/00 | (2006.01) | |
| B05B 13/00 | (2006.01) | |
| B05B 12/12 | (2006.01) | |
| E21F 5/02 | (2006.01) | |
| E01H 3/02 | (2006.01) | |
| G05B 15/02 | (2006.01) | |

(52) U.S. Cl.
CPC ............ *B05B 13/005* (2013.01); *B05B 12/12* (2013.01); *E01H 3/02* (2013.01); *E21F 5/02* (2013.01); *G05B 15/02* (2013.01)

(58) Field of Classification Search
CPC ......... B05B 13/005; B05B 12/12; E01H 3/02; E21F 5/02; G05B 15/02
USPC ....................................................... 700/283
See application file for complete search history.

(56) References Cited

U.S. PATENT DOCUMENTS

| | | | |
|---|---|---|---|
| 7,896,258 B2 | 3/2011 | Hoisington et al. | |
| 8,444,062 B2 | 5/2013 | Anderton et al. | |
| 9,037,304 B2 | 5/2015 | Anderton et al. | |
| 9,463,483 B2 | 10/2016 | Gudat et al. | |
| 9,623,429 B1 | 4/2017 | Anderton et al. | |
| 2005/0248146 A1* | 11/2005 | Byrne | B60B 39/02 |
| | | | 280/847 |
| 2013/0186432 A1* | 7/2013 | Wimmer | B60S 3/042 |
| | | | 134/123 |
| 2015/0233245 A1 | 8/2015 | Sheehan et al. | |

(Continued)

FOREIGN PATENT DOCUMENTS

WO 98/35104 A1 8/1998

OTHER PUBLICATIONS

DiSCS® Digital Spray Control System Brochure, Mega Corp., Genuine Mega, Feb. 2018.

*Primary Examiner* — Mahmoud S Ismail
(74) *Attorney, Agent, or Firm* — Harrity & Harrity, LLP

(57) ABSTRACT

A method for applying fluid to a travel lane is disclosed. The method may include receiving information related to a travel lane including a first set of tire paths and a second set of tire paths to be traveled by one or more vehicles, generating spray pattern control information for a fluid application machine having multiple spray heads based on the first set of tire paths and the second set of tire paths to be traveled by the one or more vehicles, and selectively triggering the multiple spray heads of the fluid application machine to alternately apply fluid to the first set of tire paths and the second set of tire paths based on the spray pattern control information and based on a current position of the fluid application machine on the travel lane.

20 Claims, 5 Drawing Sheets

(56) References Cited

U.S. PATENT DOCUMENTS

2018/0161798 A1\* 6/2018 Toulson ................ B32B 25/06
2019/0256058 A1\* 8/2019 Lingeskog ............. B08B 3/022

\* cited by examiner

500

510
Receive information related to a travel lane including a first set of tire paths and a second set of tire paths to be traveled by one or more vehicles

520
Generate spray pattern control information for a fluid application machine having multiple spray heads based on the travel lane to be traveled by the one or more vehicles

530
Selectively trigger the multiple spray heads of the fluid application machine to alternately apply fluid to the first set of tire paths and the second set of tire paths based on the spray pattern control information and based on a current position of the fluid application machine on the travel lane

FIG. 5

FLUID APPLICATION FOR AUTONOMOUS HAUL TRUCKS

TECHNICAL FIELD

The present disclosure relates generally to a fluid application machine and, for example, to fluid application for autonomous haul trucks.

BACKGROUND

Work environments associated with certain industries, such as the mining and construction industries, are susceptible to undesirable dust conditions. For example, worksites associated with mining, excavation, construction, landfills, material stockpiles, and/or the like may be particularly susceptible to dust due to the nature of the materials composing the worksite surface. For example, worksite surfaces of coal, shale, stone, and/or the like may easily erode, which may result in significant amounts of dust. Furthermore, typical work operations performed at these worksites may exacerbate the dust conditions. For example, at a mine site, cutting, digging, and scraping operations may break up the worksite surface, generating dust. In addition, heavy machinery traveling at such worksites, such as haul trucks, dozers, loaders, excavators, and/or the like, may disturb settled dust and increase dust levels in the air.

Accordingly, because undue dust conditions may reduce efficiency at a worksite (e.g., by impairing visibility, interfering with work operations, increasing a need to maintain and/or clean equipment, compromising the comfort, health, and safety of worksite personnel, and/or the like), fluid distribution systems are often used at mining, construction, and/or other worksites to spray water over roads and work areas to minimize and/or mitigate dust that is created during operations. A specific example might include a manned, autonomous, or semi-autonomous water truck that distributes or otherwise sprays water over roads, travel paths, or other areas in which the water truck operates. Other applications of mobile fluid distribution systems may include spraying pesticides and herbicides (e.g., for agricultural use), distributing saline solutions on roads for snow and ice control, spraying water for fire suppression and/or street cleaning, and/or the like.

However, in some cases, a path may be overwatered, which can result in slick conditions that may present risks to vehicles traveling on the overwatered path. For example, slick surface conditions from improper or excessive fluid application may lead to vehicles sliding or slipping. This may lead to equipment damage, unsafe travel conditions, damaged terrain, wasted fluid resources, and/or the like.

One attempt to apply a water spray for dust suppression in surface mining and construction applications is disclosed in "DiSCS Mega Digital Spray Control System," published by Mega Corp. in February 2018 ("the DiSCS publication"). In particular, the DiSCS publication discloses a method to automatically regulate the amount of water spray applied relative to vehicle ground speed or distance traveled. For example, the DiSCS publication discloses a system that utilizes a pulsing strategy, to automatically limit the amount of water consumed, based on vehicle speed while maintaining road dust control coverage.

While the DiSCS publication may describe distance-based spraying that uses alternating intermittent watering patterns to reduce water consumption and ensure that one steering tire and one drive tire remain on a dry surface, the DiSCS publication does not address techniques to apply fluid to a path based on a specific geometry of one or more vehicles that are to travel on the path.

The fluid application system and method of the present disclosure solves one or more of the problems set forth above and/or other problems in the art.

SUMMARY

According to some implementations, a method may include: receiving, by one or more processors associated with a fluid application machine, information related to a travel lane including a first set of tire paths and a second set of tire paths to be traveled by one or more autonomous vehicles; receiving, by the one or more processors, information related to a current position of the fluid application machine on the travel lane to be traveled by the one or more autonomous vehicles; and triggering, by the one or more processors, one or more spray heads of the fluid application machine to cause the one or more spray heads to apply fluid to the first set of tire paths, while refraining from applying fluid to the second set of tire paths, at the current position of the fluid application machine on the travel lane.

According to some implementations, a system may include: one or more memories; and one or more processors, communicatively coupled to the one or more memories, configured to: receive information related to a travel lane including a first set of tire paths and a second set of tire paths to be traveled by one or more vehicles; generate spray pattern control information for a fluid application machine having multiple spray heads based on the first set of tire paths and the second set of tire paths to be traveled by the one or more vehicles; and selectively trigger the multiple spray heads of the fluid application machine to alternately apply fluid to the first set of tire paths and the second set of tire paths based on the spray pattern control information and based on a current position of the fluid application machine on the travel lane, the spray pattern control information selectively triggering a first set of the multiple spray heads to apply fluid to the first set of tire paths while refraining from applying fluid to the second set of tire paths for a first distance, and the spray pattern control information selectively triggering a second set of the multiple spray heads to apply fluid to the second set of tire paths while refraining from applying fluid to the first set of tire paths for a second distance.

According to some implementations, a machine may include: a fluid distribution system including one or more spray heads; a positioning device configured to generate information related to a current position of the machine on a travel lane including a first set of tire paths and a second set of tire paths to be repeatedly traveled by one or more autonomous vehicles; and one or more devices configured to: selectively trigger the one or more spray heads to cause the one or more spray heads to apply fluid to the first set of tire paths, while refraining from applying fluid to the second set of tire paths, at the current position of the machine on the travel lane; and selectively trigger the one or more spray heads to cause the one or more spray heads to apply fluid to the second set of tire paths, while refraining from applying fluid to the first set of tire paths, based on the information generated by the positioning device indicating that the machine has traveled a threshold distance on the travel lane.

BRIEF DESCRIPTION OF THE DRAWINGS

FIG. 5 is a flowchart of an example process for applying fluid to a travel lane according to a spray pattern.

DETAILED DESCRIPTION

Although some implementations described herein relate to a water truck, the implementations apply equally to other types of machines that may be configured to dispense or otherwise apply fluid to a traveled surface, such as an articulated truck, an on-highway truck, a tractor-scraper, a tractor in combination with a trailer, a street cleaner, and/or the like.

Figure 1:
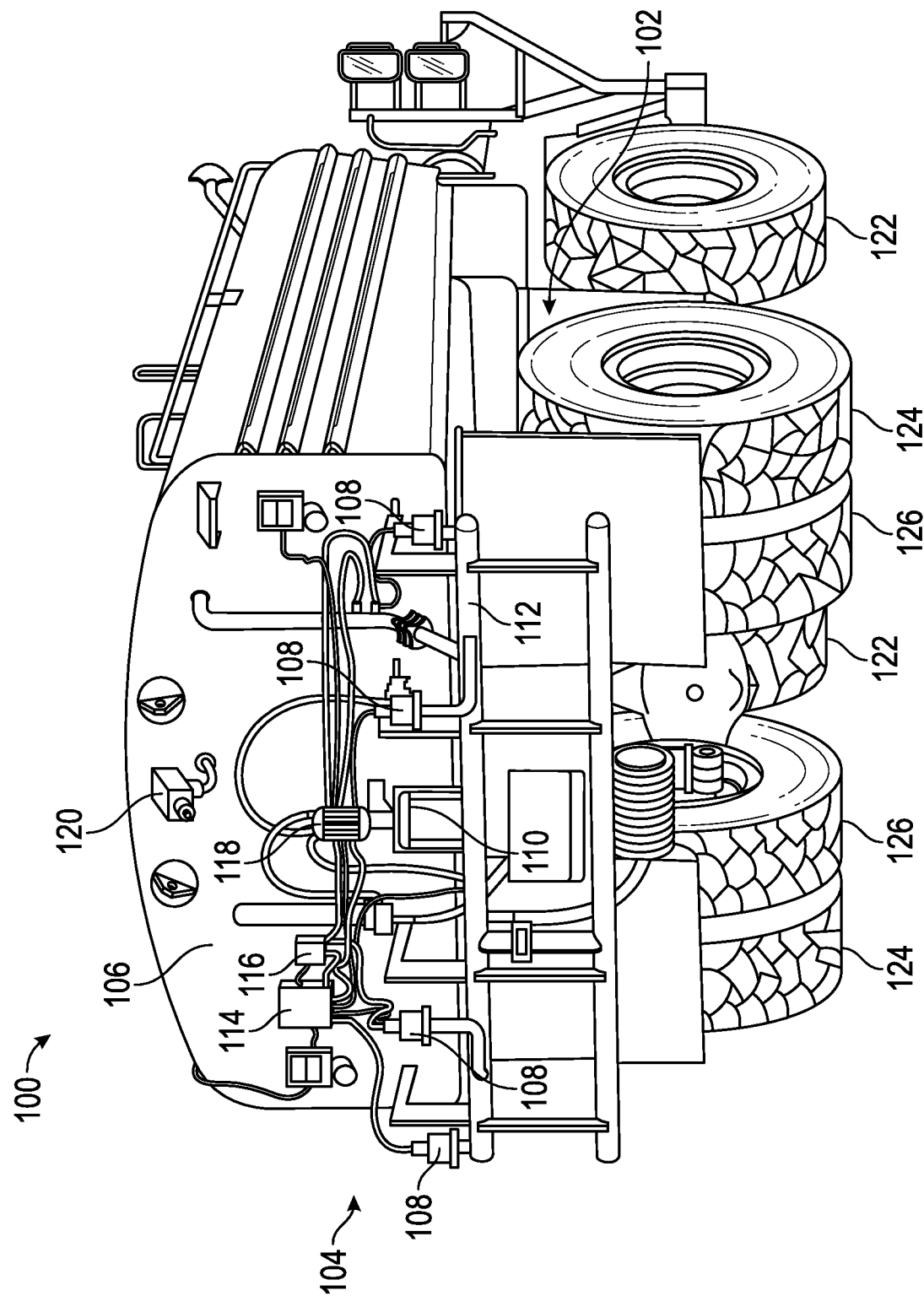
FIG. 1 is diagram of an example machine described herein.

FIG. 1 is a diagram of an example machine 100 described herein. The machine 100 is generally shown in FIG. 1 as a truck, typically used in off-highway applications, that can dispense a pressurized fluid (e.g., water).

As shown in FIG. 1, the machine 100 may include a variety of piping, hoses, pumps, valves, and/or the like for fluid transmission and/or distribution purposes. In particular, the machine 100 in FIG. 1 is shown as an off-highway truck configured as a water truck for spraying water at a worksite. However, implementations described herein may also apply to other types of mobile machines configured to distribute water or other types of fluids in various applications. For example, a tractor pulling a trailer may be used to distribute chemicals in agricultural settings, an on-highway truck may be configured to spray a saline solution on roads, runways, parking lots, and/or the like to melt snow and ice, a street cleaner may be configured to spray water onto a roadway to loosen particles and reduce dust, and/or the like.

The machine 100 includes an engine (not shown), which may be an internal combustion engine or any other suitable power source, which may be supported on a frame 102 of the machine 100. Although different arrangements and setups are contemplated, as shown in FIG. 1, the machine 100 may include, among other systems, a fluid dispensing system 104 disposed on the frame 102. The fluid dispensing system 104 may be powered by the engine. Furthermore, the engine may be configured to provide power to various other systems and devices in addition to the fluid dispensing system 104. The fluid dispensing system 104 may include a fluid source 106 (e.g., a tank) and one or more spray heads 108 fluidly connected to the fluid source 106. For example, in FIG. 1, the machine 100 is illustrated as having four spray heads 108. However, in some examples, the machine 100 may be equipped with more or fewer than four spray heads 108. The fluid dispensing system 104 may further include a delivery pump 110 mechanically coupled to a motor 118 and fluidly connected to the fluid source 106. The delivery pump 110 may be configured to deliver the pressurized fluid from the fluid source 106 to the one or more spray heads 108.

As further shown in FIG. 1, the fluid dispensing system 104 may include a fluid manifold 112, and the spray heads 108 may be mounted onto the fluid manifold 112. The fluid manifold 112 may be fluidly coupled to the delivery pump 110 and configured to receive the pressurized fluid from the delivery pump 110. The spray heads 108 may be configured to dispense the pressurized fluid (e.g., onto a travel lane to be traveled by one or more vehicles). Any quantity of the spray heads 108 may be employed in the fluid dispensing system 104 depending on specific requirements of an application. Moreover, the spray heads 108 may be mounted on the machine 100 at any desired location or orientation to provide suitable coverage of the surface onto which the fluid is to be applied. For example, the spray heads 108 may be positioned as to provide a desired spray pattern having a width suitable to cover a surface area of a travel lane at a worksite, such as one or more tire paths on a haul road, without having the various sprays overlap.

Furthermore, as described in further detail elsewhere herein, the spray heads 108 may be selectively triggered to alternately apply fluid to different sets of tire paths to be traveled based on a position of the machine 100 along the travel lane. For example, as described herein, a set of tire paths may include one or more tire paths for a pair of steer tires 122 that are substantially aligned with a pair of outer rear tires 124, one or more tire paths for a pair of inner rear tires 126, one or more tire paths for one or more sets of tires on a left side of a vehicle, a set of one or more tire paths for one or more sets of tires on a right side of a vehicle, and/or the like. In this way, the spray heads 108 may be selectively triggered to distribute fluid onto a travel lane based on a geometry of the vehicles that are to travel on the travel lane (e.g., a quantity and arrangement of tires, a vehicle width, a vehicle length, and/or the like) and based on the particular tire path(s) that the vehicles follow when traveling on the travel lane.

As further shown in FIG. 1, the fluid dispensing system 104 may include an electronic control module (ECM) 114 electrically connected to the motor 118. The ECM 114 may control one or more actuators (not shown) associated with the motor 118 of the fluid dispensing system 104. Furthermore, the ECM 114 may be electrically connected to a pressure sensor (not shown) located at the fluid manifold 112 and the spray heads 108 via one or more solenoids 116. The ECM 114 may be configured to modulate a speed of the motor 118, which may cause a fluid output from the delivery pump 110 to be varied (e.g., a flow rate, a pressure of the fluid from the delivery pump 110, and/or the like may be varied). Varying the fluid output from the delivery pump 110 may increase or decrease a pressure of the fluid in the fluid manifold 112, which may cause the spray heads 108 to dispense the fluid at an increased or decreased flow rate and/or pressure. Furthermore, the ECM 114 may be configured to change a direction in which the spray heads 108 are pointing, and thus change a direction in which the fluid is dispensed from the spray heads 108. The dispensing of the fluid from the machine 100 may be based on an operator command. For example, based on an operator command, the ECM 114 may transmit corresponding control signals for controlling an operation of the spray heads 108 of the fluid dispensing system 104. Additionally, or alternatively, the control signals for controlling the operation of the spray heads 108 may be automated (e.g., based on a position of the machine 100 and a geometry and/or path of one or more vehicles that travel on the path on which the fluid is to be dispensed).

As further shown in FIG. 1, the machine 100 may be equipped with an image capturing device 120, which may include a camera, a video camera, or another suitable imaging device. The image capturing device 120 may be positioned proximate to the fluid dispensing system 104. For example, in FIG. 1, the image capturing device 120 is positioned at a rear end of the machine 100 such that a lens of the image capturing device 120 is focused on the spray heads 108. The image capturing device 120 may be configured to generate an image feed associated with the fluid dispensing system 104. More particularly, the image feed may be indicative of whether fluid is being dispensed form the spray heads 108. In some implementations, functionality of the image capturing device 120 may be integrated with a rear view camera of the machine 100. Additionally, or alternatively, the image capturing device 120 may be a dedicated imaging device associated with the fluid dispensing system 104 on-board the machine 100. A location and quantity of the image capturing device 120 may vary based on system requirements, fluid application requirements, and/or the like.

As indicated above, FIG. 1 is provided as an example. Other examples may differ from what was described in connection with FIG. 1.

Figure 2:
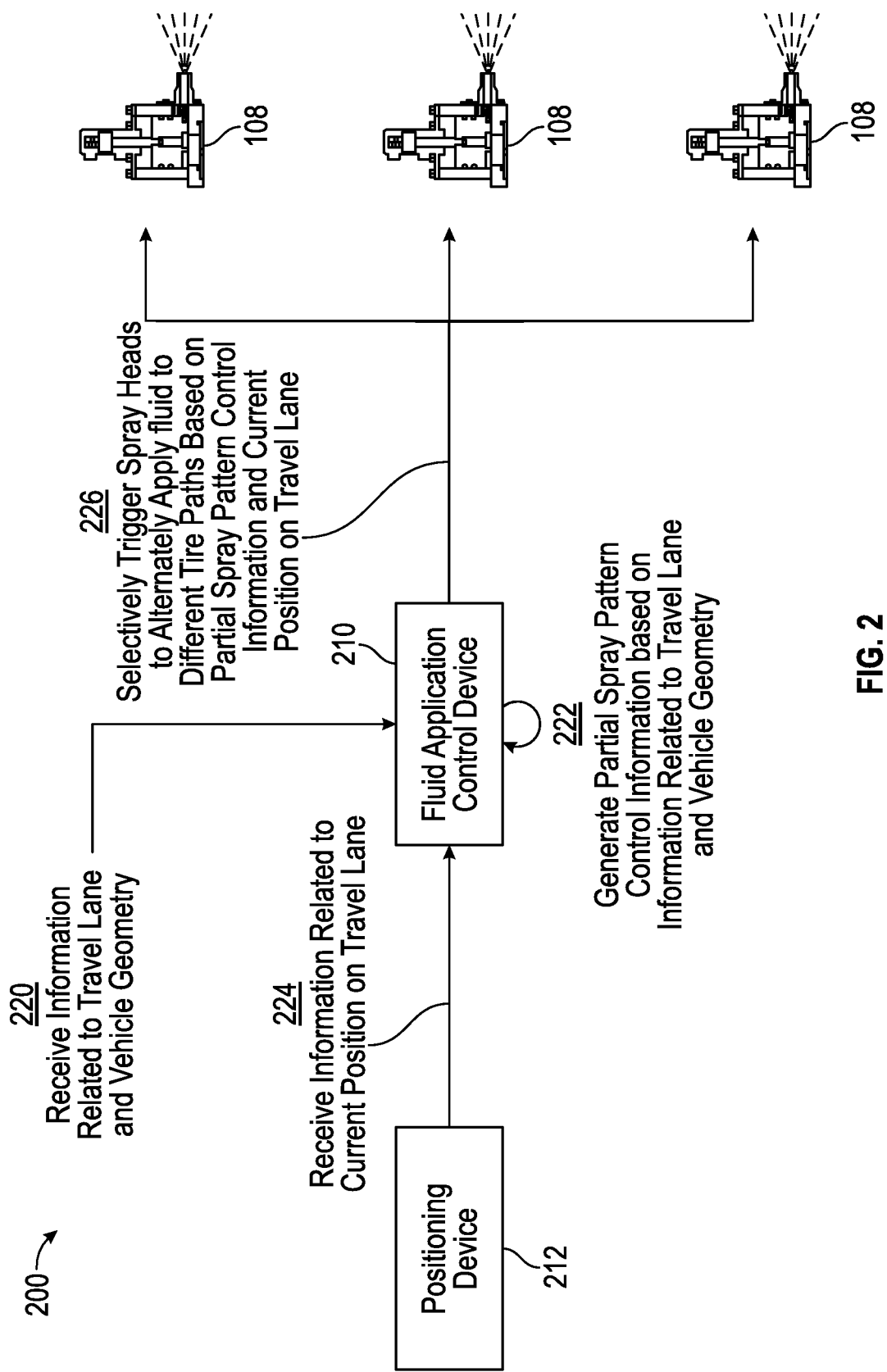
FIG. 2 is diagram of an example implementation of a system for applying fluid to a travel lane according to a spray pattern described herein.

FIG. 2 is diagram of an example implementation 200 of a system for applying fluid to a travel lane according to a spray pattern described herein. As shown in FIG. 2, the system for applying fluid to a travel lane includes a fluid application control device 210, which may be coupled to a positioning device 212 that can generate one or more signals related to a current position and/or orientation (e.g., heading) of a machine incorporating the system (e.g., a fluid application machine, such as the machine 100 shown in FIG. 1). As further shown in FIG. 2, the fluid application control device 210 may be coupled to a set of spray heads 108 associated with the machine. Accordingly, as described in further detail herein, the fluid application control device 210 may be configured with information that relates to a travel lane to be traveled by one or more vehicles and information that relates to a geometry of the one or more vehicles (e.g., tire configurations, tire widths, vehicle dimensions, and/or the like). A machine incorporating the fluid application control device 210 may travel along the travel lane and selectively trigger one or more of the spray heads 108 to apply fluid to only a portion of the travel lane as a function of distance traveled on the travel lane, which may be determined based on one or more signals provided by the positioning device 212.

More particularly, as shown in FIG. 2, and by reference number 220, the fluid application control device 210 may receive information related to the travel lane to be traveled by the one or more vehicles and also receive information related to a geometry of the one or more vehicles. For example, the one or more vehicles to travel the travel lanes may be autonomous vehicles (e.g., autonomous haul trucks) that can repeatedly travel the travel lane according to a particular set of tire paths to a centimeter-level accuracy. In other examples, the one or more autonomous vehicles may travel the travel lane according to a travel path indexing (TPI) configuration in which the set of tire paths that a particular vehicle travels may be randomly varied based on a total width of the travel lane. In this way, randomly varying the tire paths may avoid wear-and-tear that may result from vehicles repeatedly tracking the same tire paths, especially at worksites where there may be a soft underfoot. In still other examples, the one or more vehicles may be manned or semi-autonomous vehicles that do not necessarily follow an exact set of tire paths, but can generally be expected to travel on a tire path within a finite range (e.g., based on physical boundaries of the travel lane).

Accordingly, the information related to the travel lane may generally include a map or physical layout of the travel lane, including boundaries, curves, corners, turns, straightaways, obstacles, and/or other geometric features of the travel lane. In this way, the fluid application control device 210 may identify certain areas on the travel lane where vehicles are more or less likely to perform braking maneuvers, steering maneuvers, acceleration maneuvers, and/or the like. Additionally, or alternatively, the information related to the travel lane may indicate a composition of the terrain making up the travel lane (e.g., whether the travel lane is made from soil, clay, sand, gravel, and/or the like, as may often be the case at a worksite, or from asphalt, cement, and/or the like, as may often be the case on a roadway). Furthermore, in some cases, the information related to the travel lane may include information related to one or more sets of tire paths to be followed by the one or more vehicles that are to travel the travel lane. For example, where the vehicles are autonomous vehicles that tend to repeatedly track closely to the same tire path(s) with a high degree of accuracy (e.g., centimeter-level accuracy), the information related to the travel lane may include precise tire paths that the vehicles are likely to follow when traveling on the travel lane.

In other examples, where the vehicles are autonomous vehicles that use TPI to randomly vary the tire paths that each vehicle follows, the information related to the travel lane may indicate a most recent set of tire paths followed by a most recent vehicle that traveled the travel lane, average or aggregate tire paths that other vehicles recently followed, and/or the like. In this way, the fluid application control device 210 may probabilistically infer a set of tire paths that a next vehicle is likely (or unlikely) to follow. For example, because TPI randomly varies the tire paths that each vehicle follows, the fluid application control device 210 may infer that a next vehicle to travel the travel lane is unlikely to follow the same tire path as the most recent vehicle, more likely to follow a tire path that no vehicles have recently traversed, and/or the like.

Furthermore, the information related to vehicle geometries may include tire configurations, tire widths, vehicle dimensions, and/or the like, which may allow the fluid application control device 210 to determine the particular tire paths that the vehicles are likely to follow. For example, autonomous haul trucks at a worksite often have six-wheel configurations, including a pair of (front) steer tires and four rear tires (e.g., two inner rear tires and two outer rear tires). In general, the pair of steer tires tend to be substantially aligned with the outer rear tires, and the inner rear tires follow separate paths from the pair of steer tires and the outer rear tires. Accordingly, for a vehicle with a six-wheel tire configuration (e.g., similar to the tire configuration of the machine 100 shown in FIG. 1), the vehicle may follow two sets of tire paths, which may include a first set with two tire paths for the two inner rear tires and a second set with two tire paths for the two steer tires and the two outer rear tires. In other cases, the two sets of tire paths may correspond to a first set of tires on a left side of the vehicle and a second set of tires on a right side of the vehicle (e.g., a first tire path may be followed by the left steer tire and the inner and outer rear tires on the left side of the vehicle, and a second tire path may be followed by the right steer tire and the inner and outer rear tires on the right side of the vehicle).

Accordingly, the information related to the vehicle geometries may generally indicate a quantity of tires with which the vehicles are equipped (e.g., four tires, six tires, and/or the like), a layout or configuration of the tires (e.g., whether front tires are substantially aligned with certain rear tires or associated with a different tire path, widths of the tires, tire tread patterns, and/or the like), vehicle dimensions (e.g., vehicle lengths and/or widths that may indicate a spacing between tires), and/or the like. In this way, based on the information related to the vehicle geometries and the information related to the travel lane, the fluid application control device 210 may precisely determine the particular tire paths that vehicles will follow on the travel lane (e.g., in the case of autonomous vehicles that repeatedly follow the same path, narrow travel lanes, and/or the like), probabilistically determine the particular tire paths that vehicles will follow on the travel lane (e.g., in the case of autonomous vehicles that follow tire paths that are randomly varied using TPI, manned or semi-autonomous vehicles that tend to follow tire paths within a certain range, and/or the like), and/or the like.

As further shown in FIG. 2, and by reference number 222, the fluid application control device 210 may generate partial spray pattern control information based on the information related to the travel lane and the information related to the geometry of the vehicles to travel the travel lane. For example, the partial spray pattern control information may cause the fluid application machine incorporating the system to only apply fluid to part of the travel lane (e.g., some but not all the tire paths) at any given location on the travel lane. For example, the partial spray pattern control information may be based on an alternating spray pattern, where the spray heads 108 are selectively triggered to alternately apply fluid to a first set of one or more tire paths while refraining from applying fluid to a second set of one or more tire paths for a given distance, and then switching to apply fluid to the second set of tire paths while refraining from applying fluid to the first set of tire paths for a given distance. Additionally, or alternatively, the spray heads 108 may be selectively triggered to alternately apply fluid to the first set of tire paths while refraining from applying fluid to the second set of tire paths for a given time duration, and then switched to apply fluid to the second set of tire paths while refraining from applying fluid to the first set of tire paths for a given time duration. In this way, the partial spray pattern control information may ensure that there is at least one tire path with dry terrain along an entire length of the travel lane.

Furthermore, in some examples, the partial spray pattern control information may be generated based on geometric features of the travel lane, such as areas where vehicles may be likely to perform a braking maneuver, a steering maneuver, an acceleration maneuver, and/or the like. For example, the partial spray pattern control information may indicate that the spray heads 108 are to be selectively triggered to refrain from applying fluid to one or more tire paths that are followed by one or more steer tires to ensure that the underlying terrain is sufficiently dry to maintain shear strength when the steer tires apply force in acceleration, braking, cornering, and/or the like. In another example, where the terrain of the travel lane is made from sand, the partial spray pattern control information may indicate that the spray heads 108 are to be selectively triggered to apply fluid to one or more of the tire paths that are followed by the steer tires because dry sand tends to have a low shear strength due to poor cohesiveness among sand particles (e.g., applying fluid to the tire paths to be followed by the steer tires may improve traction on dry sand).

As further shown in FIG. 2, and by reference number 224, the fluid application control device 210 may receive, from the positioning device 212, information related to a current position of the fluid application machine incorporating the system on the travel lane. For example, as mentioned elsewhere herein, the fluid application machine may be a manned, autonomous, or semi-autonomous vehicle that is operated to travel the same path on the travel lane that will be traveled by subsequent vehicles and to distribute or otherwise apply fluid to the travel lane while traveling on the travel lane. Accordingly, the positioning device 212 may generate one or more signals that relate to the current position of the fluid application machine on the travel lane, which may indicate which spray heads 108 are to be selectively triggered. For example, the positioning device 212 may include a Global Positioning System (GPS) device, a Global Navigation Satellite System (GNSS) device, a pseudolite and/or pseudo-satellite device, an inertial navigation device, and/or the like. In some cases, the positioning device 212 may further include an orientation sensor configured to generate one or more signals that indicate a heading direction and/or an inclination of the machine on the travel lane. For example, the orientation sensor may include a laser-level sensor, a tilt sensor, an inclinometer, a radio direction finder, a gyrocompass, a fluxgate compass, or another suitable device that can determine a pitch, yaw, and/or roll of the machine as the machine operates to travel on and apply fluid to the travel lane.

As further shown in FIG. 2, and by reference number 226, the fluid application control device 210 may selectively trigger the spray heads 108 to alternately apply fluid to different tire paths (while refraining from applying fluid to at least some tire paths) based on the partial spray pattern control information and the current position of the machine on the travel lane. For example, as mentioned above, the partial spray pattern control information may indicate that the spray heads 108 are to be selectively triggered to apply fluid to a first set of tire paths (e.g., for inner rear tires, for steer tires and outer rear tires, for tires on the left side of a vehicle, for tires on the right side of a vehicle, and/or the like) while refraining from applying fluid to a second set of tire paths for a given distance. After the machine has traveled the given distance, the partial spray pattern control information may indicate that the spray heads 108 are to be selectively triggered to apply fluid to the second set of tire paths while refraining from applying fluid to the first set of tire paths for a given distance. In this way, fluid resources may be conserved by refraining from applying fluid to at least some tire paths along an entire length of the travel lane. Furthermore, by refraining from applying fluid to at least some tire paths, there will be at least some dry terrain providing tractive capabilities along the entire length of the travel lane. Furthermore, by alternately applying fluid to the first set of tire paths and the second set of tire paths, tires on the vehicles traveling the travel lane may roll the moisture in the areas where fluid is applied into the areas where fluid is not applied, which may achieve the desired effect of the fluid application (e.g., dust control, salinization, street cleaning, and/or the like).

Furthermore, based on the current position on the travel lane, the fluid application control device 210 may selectively trigger the spray heads 108 based on proximity to one or more geometric features of the travel lane. For example, when the machine is within a threshold distance of a geometric feature where a vehicle may be likely to perform a braking maneuver, a steering maneuver, an acceleration maneuver, and/or the like, the spray heads may be selectively triggered to improve traction for a set of steer tires. For example, the spray heads 108 may be selectively triggered to apply fluid to a set of tire paths to be followed by one or more sets of tires other than the steer tires (e.g., to avoid creating slick conditions that may reduce tractive capability) while refraining from applying fluid to a set of tire paths to be followed by the steer tires (e.g., to provide dry terrain under the steer tires). In other examples (e.g., where the terrain is made from dry sand or other material that may have poor shear strength in dry conditions, the reverse approach may be applied to improve traction for the steer tires.

The spray heads 108 may be selectively triggered according to one or more parameters used to control which spray heads 108 apply fluid, where fluid is applied, how much fluid is applied, and/or how long fluid is applied to the different sets of tire paths. For example, where the partial spray pattern control information defines a pattern that alternates between applying fluid to a set of one or more tire paths, to be followed by vehicles, on a left side of a vehicle and one or more tire paths, to be followed by vehicles, on a right side of a vehicle, a subset of the spray heads 108 may be turned on and a subset of the spray heads 108 may be turned off to achieve the desired spray pattern. For example, in the three sprayer arrangement shown in FIG. 2, one outer spray head 108 may be turned on, one outer spray head 108 may be turned off, and the center spray head 108 may be turned off or directed towards the set of tire paths to which fluid is to be applied. In another example, in an arrangement with an even quantity of spray heads 108, one or more spray heads 108 positioned over the left set of tire paths may be turned on, and one or more spray heads 108 positioned over the right set of tire paths may be turned off, or vice versa. In other examples, the three sprayer arrangement shown in FIG. 2 may be used to alternately spray inner and outer tire paths, as will be described in more detail below with reference to FIGS. 3-4.

In other examples, as mentioned above, the one or more parameters for selectively triggering the spray heads 108 may be used to control where fluid is applied, how much fluid is applied, how long fluid is applied, and/or the like. For example, the fluid application control device 210 may have a capability to control a direction of the spray heads 108, a rate at which the spray heads 108 dispense fluid, a pressure of the fluid dispensed from the spray heads 108, a speed of a delivery pump, and/or other parameters to control the manner in which fluid is dispensed. Furthermore, the fluid application control device 210 may monitor the information received from the positioning device 212 to determine the current position of the machine over time and to selectively trigger the spray heads 108 to avoid overapplying fluid to a particular set of tire paths. For example, if the machine is stationary and the spray heads 108 are dispensing fluid onto a localized area of a given set of tire paths for a threshold time period, the spray heads 108 may be turned off to avoid creating a slick surface that may result in vehicles slipping, sliding, hydroplaning, and/or the like.

As indicated above, FIG. 2 is provided as an example. Other examples may differ from what was described in connection with FIG. 2.

Figure 3:
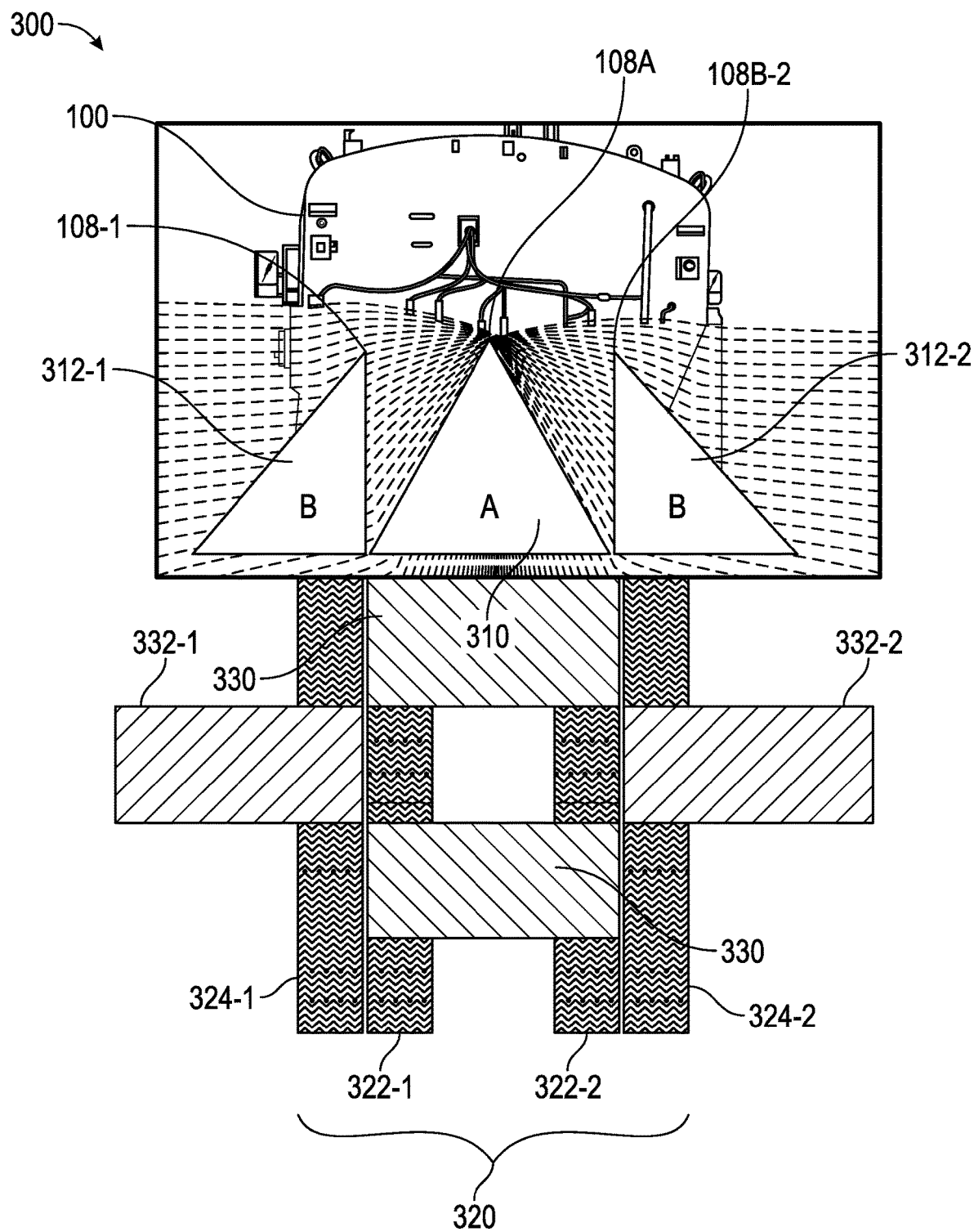
FIG. 3 is diagram of an example implementation of a fluid application machine applying fluid to a travel lane according to a spray pattern described herein.

FIG. 3 is diagram of an example implementation 300 of a fluid application machine applying fluid to a travel lane according to a spray pattern described herein. In the example implementation 300 shown in FIG. 3, a machine 100 (e.g., a fluid application machine, such as a water truck) includes three spray heads 108, which include an inner or central spray head 108A and a pair of outer spray heads 108B-1, 108B-2 that are respectively located on the left side and the right side of the machine 100. As shown in FIG. 3, the inner or central spray head 108A may be configured to dispense fluid according to a first spray pattern 310, and the pair of outer spray heads 108B-1, 108B-2 may be configured to dispense fluid according to respective spray patterns 312-1, 312-2 that do not overlap with the first spray pattern 310.

As further shown in FIG. 3, the machine 100 may be configured to travel on a travel lane 320 that includes a first set of tire paths 322-1, 322-2 to be followed by a pair of inner rear tires and a second set of tire paths 324-1, 324-2 to be followed by a pair of steer tires and a pair of outer rear tires. However, in other examples, the travel lane 320 may be divided into separate tire paths in other ways, such as a left-right pattern in which the first set of tire paths includes tire paths 322-1, 324-1 and the second set of tire paths includes tire paths 322-2, 324-2. As further shown in FIG. 3, the spray heads 108 may be selectively triggered to alternate between applying fluid to the first set of tire paths 322-1, 322-2 while refraining from applying fluid to the second set of tire paths 324-1, 324-2, and applying fluid to the second set of tire paths 324-1, 324-2 while refraining from applying fluid to the first set of tire paths 322-1, 322-2.

For example, as shown by reference number 330-1, the central or inner spray 108A is initially turned on to apply fluid to the first set of tire paths 322-1, 322-2 while the outer spray heads 108B-1, 108B-2 are turned off to refrain from applying fluid to the second set of tire paths 324-1, 324-2. As further shown by reference numbers 332-1, 332-3, the central or inner spray 108A is turned off to discontinue fluid application on the first set of tire paths 322-1, 322-2 while the outer spray heads 108B-1, 108B-2 are turned on to apply fluid to the second set of tire paths 324-1, 324-2 after the machine 100 has traveled a threshold distance. As further shown by reference number 330-1, after the machine 100 has traveled another threshold distance, the central or inner spray 108A is turned back on to resume fluid application on the first set of tire paths 322-1, 322-2 while the outer spray heads 108B-1, 108B-2 are turned off to discontinue fluid application on the second set of tire paths 324-1, 324-2. This alternating pattern may generally continue as a function of distance that the machine 100 travels along the travel lane 320 to ensure that fluid is applied on at least some tire paths and no fluid is applied on at least some tire paths along an entire length of the travel lane. However, as mentioned elsewhere herein, the alternating pattern may be varied based on geometric features of the travel lane and/or a material that makes up the travel lane. For example, the outer spray heads 108B-1, 108B-2 may be turned off or on to provide additional tractive capability on the second set of tire paths 324-1, 324-2 when the machine 100 is within a threshold distance of a portion of the travel lane 320 where one or more vehicles are likely to perform a braking maneuver, a steering maneuver, and/or the like.

As indicated above, FIG. 3 is provided as an example. Other examples may differ from what was described in connection with FIG. 3.

Figure 4:
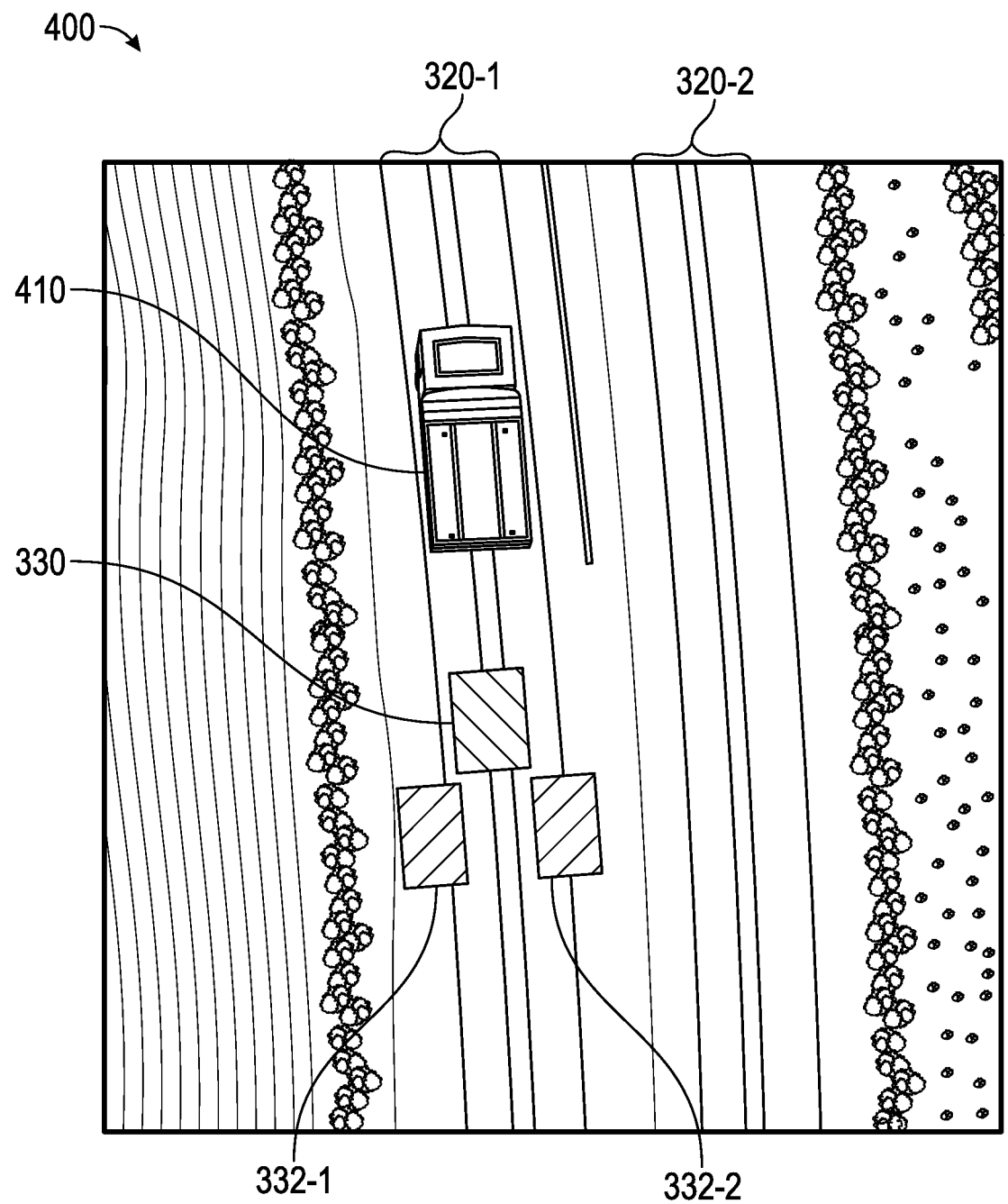
FIG. 4 is diagram of an example implementation of a vehicle traveling on a travel lane with fluid applied according to a spray pattern described herein.

FIG. 4 is diagram of an example implementation 400 of a vehicle 410 traveling on a travel lane 320-1 with fluid applied according to a spray pattern described herein. For example, as shown in FIG. 4, the travel lane 320-1 may have been previously traveled by the machine 100 applying the alternating spray pattern shown in FIG. 3. In particular, as shown by reference numbers 330, 332-1, 332-2, fluid may be alternately applied to a set of tire paths for the inner rear tires and to a set of tire paths for the steer tires and outer rear tires. Accordingly, when the vehicle 410 travels along the travel lane 320-1, at least two of the six tires on the vehicle may always be on dry terrain, which provides the vehicle 410 with better traction than if fluid were to be applied to the entire travel lane 320-1. Furthermore, fluid may be similarly applied in an alternating manner to other travel lanes (e.g., travel lane 320-2) that include multiple sets of tire paths (e.g., for inner and outer tires, for left and right tires, and/or the like) to achieve a desired application (e.g., dust control, erosion control, salinization, and/or the like) while ensuring that there is at least some dry terrain along the entire travel lane.

As indicated above, FIG. 4 is provided as an example. Other examples may differ from what was described in connection with FIG. 4.

FIG. 5 is a flow chart of an example process 500 for applying fluid to a travel lane according to a spray pattern. One or more process blocks of FIG. 5 may be performed by a device or one or more processors of a device, such as a fluid application control device (e.g., fluid application control device 210). Additionally, or alternatively, one or more process blocks of FIG. 5 may be performed by another device or a group of devices separate from or including the fluid application control device, such as a positioning device (e.g., positioning device 212), an ECM (e.g., ECM 114), a fluid application machine (e.g., machine 100), and/or the like.

As shown in FIG. 5, process 500 may include receiving information related to a travel lane including a first set of tire paths and a second set of tire paths to be traveled by one or more vehicles (block 510). For example, the fluid application control device (e.g., using one or more processors, a memory, a communication interface, and/or the like) may receive information related to a travel lane including a first set of tire paths and a second set of tire paths to be traveled by one or more vehicles, as described above. In some implementations, the first set of tire paths and the second set of tire paths may be based on a geometry of the one or more vehicles. For example, the first set of tire paths and the second set of tire paths may include one or more tire paths to be traveled by a pair of steer tires and a pair of outer rear tires associated with the one or more vehicles, one or more tire paths to be traveled by a pair of inner rear tires associated with the one or more vehicles, one or more tire paths to be traveled by a set of tires on a left side of the one or more vehicles, one or more tire paths to be traveled by a set of tires on a right side of the one or more vehicles, and/or the like. The information related to the travel lane may include information related to one or more geometric features of the travel lane (e.g., areas where there is a change in direction along the travel lane, such as a corner or a curve, or other geometric features that may necessitate a braking maneuver, a steering maneuver, an acceleration maneuver, and/or the like). The information related to the travel lane may include travel path indexing information that indicates most recent tire paths followed by a most recent vehicle that traveled the travel lane, and the first and/or second sets of tire paths may differ from the most recent tire paths followed by the most recent vehicle that traveled the travel lane.

As further shown in FIG. 5, process 500 may include generating spray pattern control information for a fluid application machine having multiple spray heads based on the first set of tire paths and the second set of tire paths to be traveled by the one or more vehicles (block 520). For example, the fluid application control device (e.g., using the one or more processors, the memory, and/or the like) may generate spray pattern control information for a fluid application machine having multiple spray heads based on the first set of tire paths and the second set of tire paths to be traveled by the one or more vehicles, as described above. The spray pattern control information may indicate that one or more of the spray heads are to refrain from applying fluid to provide traction for the pair of steer tires in areas that are near geometric features that may necessitate a braking maneuver, a steering maneuver, an acceleration maneuver, and/or the like. Additionally, or alternatively, the spray pattern control information may include information to control a rate and/or direction in which the multiple spray heads are to apply fluid. The spray pattern control information may be used by an autonomous operation component configured to cause the fluid application machine to follow the first set of tire paths and the second set of tire paths to be traveled by the one or more vehicles while selectively triggering the one or more spray heads.

As further shown in FIG. 5, process 500 may include selectively triggering the multiple spray heads of the fluid application machine to alternately apply fluid to the first set of tire paths and the second set of tire paths based on the spray pattern control information and based on a current position of the fluid application machine on the travel lane (block 530). For example, the fluid application control device (e.g., using the one or more processors, the memory, an output component, the communication interface, and/or the like) may selectively trigger the multiple spray heads of the fluid application machine to alternately apply fluid to the first set of tire paths and the second set of tire paths based on the spray pattern control information and based on a current position of the fluid application machine on the travel lane, as described above. For example, the spray pattern control information may selectively trigger a first set of the multiple spray heads to apply fluid to the first set of tire paths while refraining from applying fluid to the second set of tire paths for a first distance and selectively trigger a second set of the multiple spray heads to apply fluid to the second set of tire paths while refraining from applying fluid to the first set of tire paths for a second distance. In general, the spray heads may be selectively triggered to ensure that there is at least some dry terrain in one or more of the first set of tire paths or the second set of tire paths along an entire length of the travel lane. For example, at least one inner spray head may be arranged to apply fluid to a set of tire paths to be traveled by a pair of inner rear tires, and at least two outer spray heads may be arranged to apply fluid to a set of tire paths to be traveled by a pair of steer tires and a pair of outer rear tires. In another example, at least one spray head may be arranged to apply fluid to a set of tire paths to be traveled by a set of tires on a left side of the one or more vehicles, and at least one spray head may be arranged to apply fluid to another set of tire paths to be traveled by another set of tires on a right side of the one or more vehicles.

Process 500 may include additional implementations, such as any single implementation or any combination of implementations described below and/or in connection with one or more other processes described elsewhere herein. Furthermore, although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

Overwatering and slick surface conditions that may result from fluid application on a travel lane present a risk to vehicles that traverse the travel lane. For example, when fluid is applied to an entire travel surface, vehicle tires passing over the wet surface may lose contact with the underlying terrain, which may result in the vehicle tires slipping, sliding, hydroplaning, and/or the like as the tires lose the friction necessary to execute braking, cornering, steering, and/or other maneuvers. Furthermore, applying more fluid than is necessary for a given application (e.g., dust control) may waste limited fluid resources, cause pollution due to runoff, compromise terrain due to erosion, and/or the like. Accordingly, techniques described herein to alternately apply fluid to different sets of tire paths that are frequently and/or repeatedly traveled in a targeted manner may reduce the amount of fluid that is dispensed and reduce or mitigate the adverse consequences (e.g., slick surface conditions, erosion, and/or the like) that may otherwise result from overapplication of fluid to the entire travel lane. Furthermore, by alternately applying fluid to different sets of tire paths, vehicles that subsequently travel along the travel lane may roll moisture forward from areas where fluid was applied to areas where fluid was not applied, which improves the efficiency of the fluid application. Furthermore, by taking into consideration the specific geometries, layouts, and/or other characteristics of the travel lane and the vehicles that are to travel on the travel lane, the fluid application techniques described herein may efficiently and precisely target fluid application to improve tractive capability along the path(s) that the vehicles will follow when traveling the path.

What is claimed is:

1. A method, comprising:
   receiving, by one or more processors associated with a fluid application machine, information related to a travel lane including a first set of tire paths and a second set of tire paths to be traveled by one or more autonomous vehicles;
   receiving, by the one or more processors, information related to a current position of the fluid application machine on the travel lane to be traveled by the one or more autonomous vehicles; and
   triggering, by the one or more processors, one or more spray heads of the fluid application machine to cause the one or more spray heads to apply fluid to the first set of tire paths, while refraining from applying fluid to the second set of tire paths, at the current position of the fluid application machine on the travel lane.

2. The method of claim 1, further comprising:
   receiving updated information related to a change in the current position of the fluid application machine on the travel lane to be traveled by the one or more autonomous vehicles; and
   causing the one or more spray heads to apply fluid to the second set of tire paths, while refraining from applying fluid to the first set of tire paths, at the current position of the fluid application machine on the travel lane based on the updated information indicating that the change in the current position satisfies a threshold value.

3. The method of claim 2, further comprising:
   alternating between causing the one or more spray heads to apply fluid to only the first set of tire paths and causing the one or more spray heads to apply fluid to only the second set of tire paths as the fluid application machine travels along the travel lane.

4. The method of claim 1, wherein one of the first set of tire paths or the second set of tire paths is to be traveled by a pair of steer tires and a pair of outer rear tires associated with the one or more autonomous vehicles, and wherein one of the first set of tire paths or the second set of tire paths is to be traveled by a pair of inner rear tires associated with the one or more autonomous vehicles.

5. The method of claim 1, wherein one of the first set of tire paths or the second set of tire paths is to be traveled by a first set of tires on a left side of the one or more autonomous vehicles, and wherein one of the first set of tire paths or the second set of tire paths is to be traveled by a second set of tires on a right side of the one or more autonomous vehicles.

6. The method of claim 1, further comprising:
   determining that a distance between a geometric feature of the travel lane and the current position of the fluid application machine on the travel lane satisfies a threshold value; and
   determining that the second set of tire paths is to be traveled by a pair of steer tires associated with the one or more autonomous vehicles,
      wherein the one or more spray heads are triggered to refrain from applying fluid to the second set of tire paths to provide traction for the pair of steer tires in an area near the geometric feature of the travel lane.

7. The method of claim 1, wherein triggering the one or more spray heads of the fluid application machine includes controlling one or more of a rate or a direction in which the one or more spray heads apply the fluid to the first set of tire paths.

8. The method of claim 1, further comprising:
   receiving travel path indexing information that indicates most recent tire paths followed by a most recent autonomous vehicle that traveled the travel lane,
      wherein one or more of the first set of tire paths or the second set of tire paths differ from the most recent tire paths followed by the most recent autonomous vehicle that traveled the travel lane.

9. A system, comprising:
   one or more memories; and
   one or more processors, communicatively coupled to the one or more memories, configured to:
      receive information related to a travel lane including a first set of tire paths and a second set of tire paths to be traveled by one or more vehicles;
      generate spray pattern control information for a fluid application machine having multiple spray heads based on the first set of tire paths and the second set of tire paths to be traveled by the one or more vehicles; and
      selectively trigger the multiple spray heads of the fluid application machine to alternately apply fluid to the first set of tire paths and the second set of tire paths based on the spray pattern control information and based on a current position of the fluid application machine on the travel lane,
         the spray pattern control information selectively triggering a first set of the multiple spray heads to apply fluid to the first set of tire paths while refraining from applying fluid to the second set of tire paths for a first distance, and
         the spray pattern control information selectively triggering a second set of the multiple spray heads to apply fluid to the second set of tire paths while refraining from applying fluid to the first set of tire paths for a second distance.

10. The system of claim 9, wherein one of the first set of tire paths or the second set of tire paths is to be traveled by a pair of steer tires and a pair of outer rear tires associated with the one or more vehicles, and wherein one of the first set of tire paths or the second set of tire paths is to be traveled by a pair of inner rear tires associated with the one or more vehicles.

11. The system of claim 10, wherein:
    the first set of spray heads includes at least one inner spray head arranged to apply fluid to the one of the first set of tire paths or the second set of tire paths to be traveled by the pair of inner rear tires, and the second set of spray heads includes at least two outer spray heads arranged to apply fluid to the one of the first set of tire paths or the second set of tire paths to be traveled by the pair of steer tires and the pair of outer rear tires.

12. The system of claim 9, wherein one of the first set of tire paths or the second set of tire paths is to be traveled by a first set of tires on a left side of the one or more vehicles, and wherein one of the first set of tire paths or the second set of tire paths is to be traveled by a second set of tires on a right side of the one or more vehicles.

13. The system of claim 12, wherein:
the first set of spray heads includes at least one spray head arranged to apply fluid to the one of the first set of tire paths or the second set of tire paths to be traveled by the first set of tires on the left side of the one or more vehicles, and the second set of spray heads includes at least one spray head arranged to apply fluid to the one of the first set of tire paths or the second set of tire paths to be traveled by the second set of tires on the right side of the one or more vehicles.

14. The system of claim 9, wherein the spray pattern control information includes information to selectively cause the multiple spray heads to refrain from applying fluid to one of the first set of tire paths or the second set of tire paths to be traveled by a pair of steer tires associated with the one or more vehicles in one or more areas that are within a threshold distance of a change in direction along the travel lane.

15. The system of claim 9, wherein the spray pattern control information includes information to control one or more of a rate or a direction in which the first set of the multiple spray heads and the second set of the multiple spray heads apply the fluid.

16. A machine, comprising:
a fluid distribution system including one or more spray heads;
a positioning device configured to generate information related to a current position of the machine on a travel lane including a first set of tire paths and a second set of tire paths to be repeatedly traveled by one or more autonomous vehicles; and one or more devices configured to:
selectively trigger the one or more spray heads to cause the one or more spray heads to apply fluid to the first set of tire paths, while refraining from applying fluid to the second set of tire paths, at the current position of the machine on the travel lane; and
selectively trigger the one or more spray heads to cause the one or more spray heads to apply fluid to the second set of tire paths, while refraining from applying fluid to the first set of tire paths, based on the information generated by the positioning device indicating that the machine has traveled a threshold distance on the travel lane.

17. The machine of claim 16, further comprising an autonomous operation component configured to cause the machine to follow the first set of tire paths and the second set of tire paths to be repeatedly traveled by the one or more autonomous vehicles while selectively triggering the one or more spray heads.

18. The machine of claim 16, wherein the one or more spray heads are selectively triggered to ensure that there is at least some dry terrain in one or more of the first set of tire paths or the second set of tire paths along an entire length of the travel lane.

19. The machine of claim 16, wherein the one or more devices are further configured to:
identify the first set of tire paths and the second set of tire paths based on a geometry of the one or more autonomous vehicles.

20. The machine of claim 16, wherein the one or more devices are further configured to:
alternate between causing the one or more spray heads to apply fluid to only the first set of tire paths and causing the one or more spray heads to apply fluid to only the second set of tire paths as the machine travels along the travel lane.

* * * * *